United States Patent

[11] 3,610,751

[72] Inventor Yoshio Miyauchi
 Hikone, Japan
[21] Appl. No. 777,274
[22] Filed Nov. 20, 1968
[45] Patented Oct. 5, 1971
[73] Assignee Dainppon Screen Mfg. Co., Ltd.
 Kyoto, Japan
[32] Priority Nov. 30, 1967
[33] Japan
[31] 42-76395

[54] DEVICE FOR CONTROLLING AUTOMATICALLY THE SUCTION ZONES OF VACUUM BACK IN PHOTOMECHANICAL CAMERA
 5 Claims, 4 Drawing Figs.
[52] U.S. Cl. .................................................. 355/73
[51] Int. Cl. ................................................. G03b 27/60
[50] Field of Search ........................................... 355/73, 72

[56] References Cited
UNITED STATES PATENTS
2,376,416 5/1945 Campbell .................... 355/73 X
2,895,706 7/1959 Blatherwick ................ 355/73 X Primary Examiner—Samuel S. Matthews
Assistant Examiner—Monroe H. Hayes
Attorney—Spensley, Horn & Lubitz ABSTRACT: Device for controlling automatically the suction zones of vacuum back in photomechanical camera, wherein the position of the vacuum back determines the size of the vacuum zone activated for holding the film and secondly a large vacuum zone is activated for holding the screen.

YOSHIO MIYAUCHI INVENTOR

BY Spensley & Horn

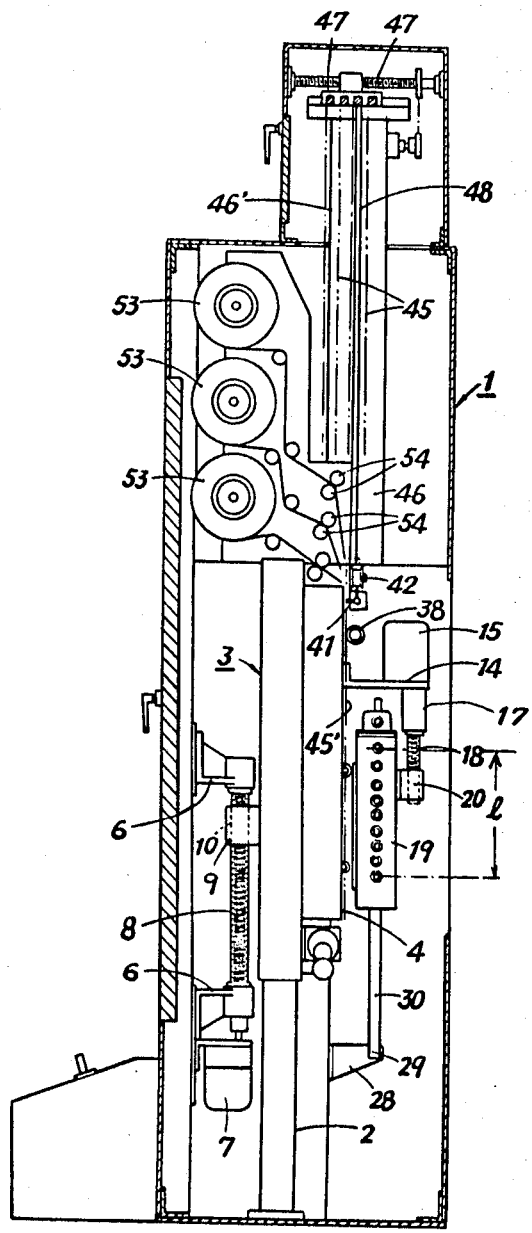

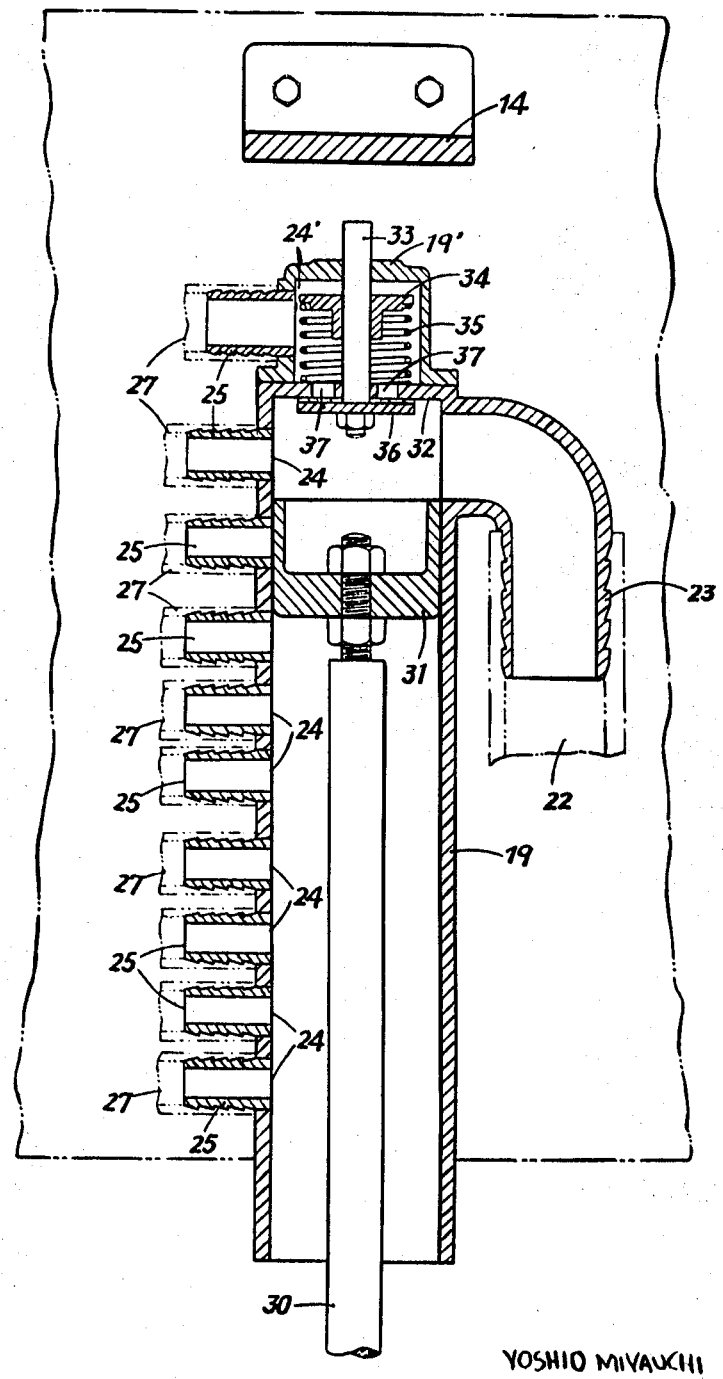

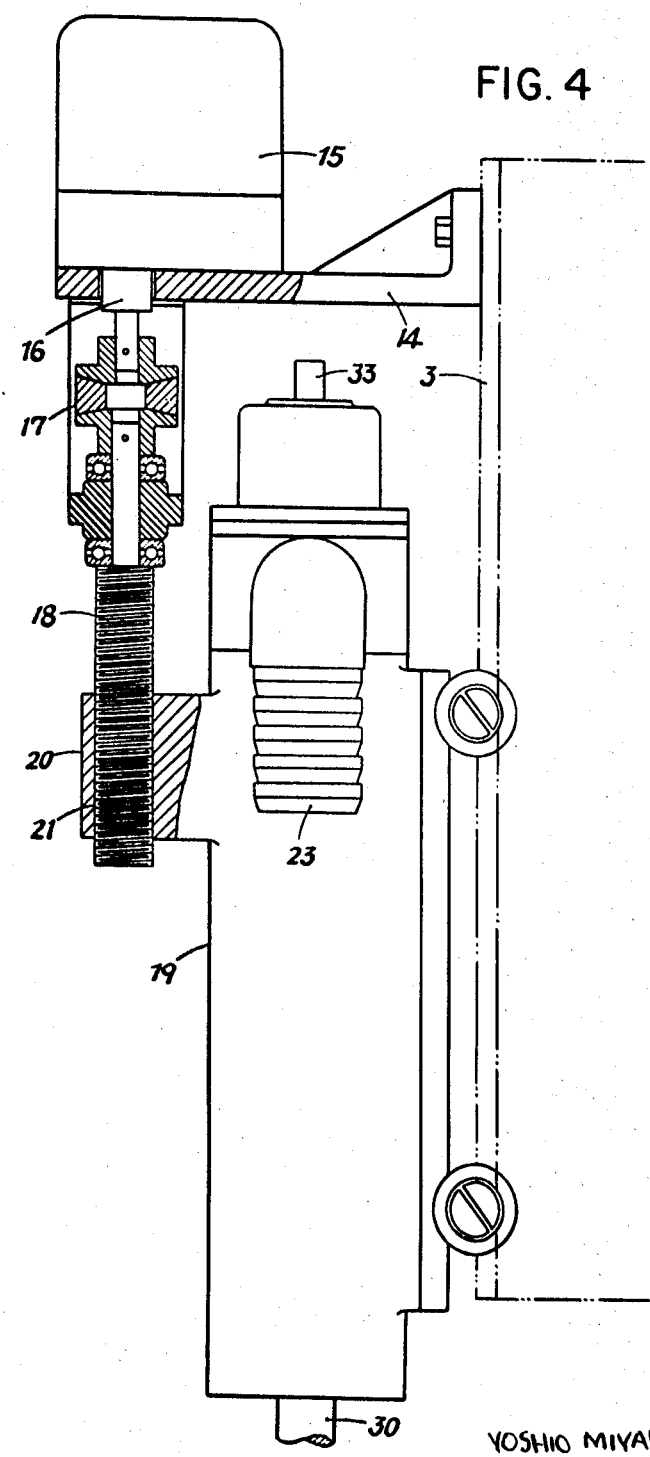

3,610,751

DEVICE FOR CONTROLLING AUTOMATICALLY THE SUCTION ZONES OF VACUUM BACK IN PHOTOMECHANICAL CAMERA

BRIEF DESCRIPTION OF THE DRAWINGS

The drawings show an embodiment of this invention whereas:

FIG. 2 is the side sectional view;
FIG. 3 is the front sectional view of the control means for selecting the vacuum film contact zones;
and
FIG. 4 is the side view of the same means of FIG. 3 partly broken away.

DETAILED DESCRIPTION OF THE INVENTION

Figure 1:
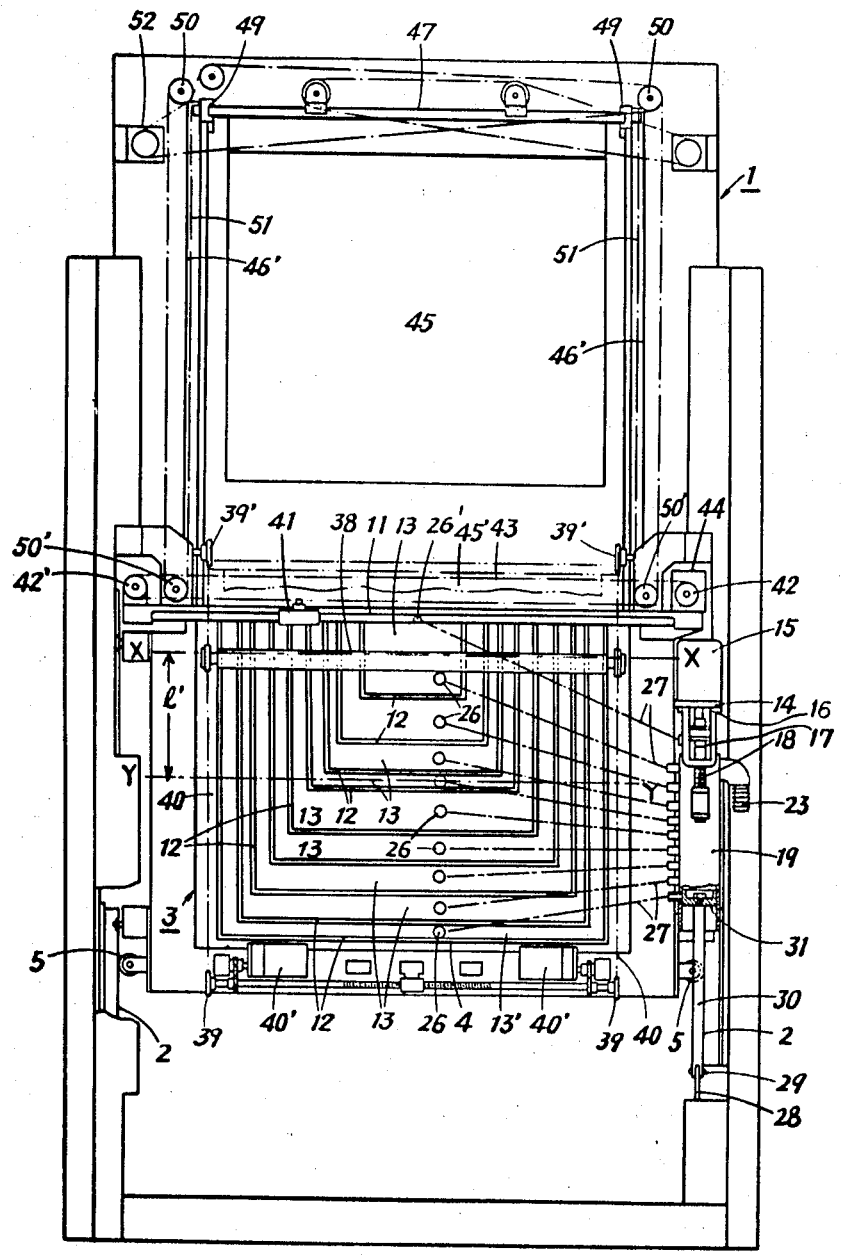
FIG. 1 is the front view partly broken away.

This invention is for the purpose of centering vacuum zones sectioned on a vacuum back from its datum edge of the optical axis by moving the vacuum back installed in the lower half of the rear case and contacting the required film to the surface of the vacuum back by aspiration by selecting the zone to correspond with the said film through valves of a cylinder and to vacuum contact a contact screen lowered over the surface of the film by drawing out air from a zone one size larger around the film than the zones used for vacuum contacting the film thereby securely contacting the contact screen against the vacuum board over the film so as to enable exposing the image onto the film through the contact screen.

In order to expose the desired image on a flat surface of the film in a photomechanical camera, it is necessary to use a vacuum back to contact the film perfectly against the surface or in the case when the contact screen is used, to contact it perfectly against the surface of the film and the vacuum back.

The films on which the image is to be exposed are of various sizes and, moreover, when a film is automatically fed from a roll film, a device for cutting the film must be provided at one end of the vacuum back, the center of one edge of the vacuum back is set as the datum edge for the various sizes of the concentric zones provided on the vacuum back, the zones up to the size of the film are employed for vacuum contact of the film to the surface of the vacuum board.

Therefore, in order to vacuum contact a film to the surface of the vacuum back, the corresponding zone must first be centered on the optical axis of the camera lens according to the size of the required film and the air within the zone must be aspirated and the contact screen which covers the surface of the film must also be vacuum contacted so that it will be perfectly in contact with the surface of the film and the vacuum back.

The subject invention is for the purpose of attaining this object and is explained by the drawings which show an embodiment of this invention.

A vacuum back 3 (FIG. 1), having a vacuum contact surface 4 (FIG. 2) which faces the front or the lens assembly of the camera rides on two guide rails 2—2, that are installed on the lower half section of the rear case 1 through the medium of wheels 5—5 so that the vacuum back 3 can be moved up and down. The movement of vacuum back 3 is substantially perpendicular to the optical axis.

The top edge of the vacuum contact surface 4 of the vacuum back 3 is provided with a groove 11. A specific number of grooves 12 in a shape and as a block-type U of different sizes are provided, the sizes of the U-groove getting bigger towards the border, they forming the corridors for the different vacuum zones 13.

An electric motor 15 is installed on one side of the front upper part of the vacuum back 3 on a projecting piece 14. The drive shaft 16 of motor 15 passes through the projecting piece 14, and the lower end of the drive shaft is coupled to a screw 18 by a coupling 17 (FIG. 4).

The screw 18 is passed through a guide piece 20 which is provided with an internal screw 21 and which is attached to a cylinder 19 of a specific length. The bottom end of cylinder 19 is left open and the position of the cylinder 19 is vertical so that when the screw 18 is turned in the right or reverse direction by the electric motor 15, the cylinder 19 will travel lengthwise up or down accordingly.

At the top of the cylinder 19 is a connector 23 for an air hose 22 from a vacuum pump (not shown) and the said cylinder 19 is provided with openings 24 and opening 24'. The openings 24 are located along one side of cylinder 19 in the lengthwise direction covering a distance as shown by 1, the distance of which is equivalent to the distance 1 which is the horizontal centerline X—X of the minimum vacuum contact zone 13 and the horizontal centerline Y—Y of the maximum contact zone 13 of the various contact zones 13 respectively. The openings 24 correspond to the number of corridors of the respective vacuum contact zones 13. It is preferred that the centerline of the vacuum zone, the approximate center of the cut film and the optical axis are aligned when positioning is complete. Thus the moving of a vacuum zone centerline to the optical axis results in the opening of the appropriate number of openings 25.

The openings 24 and 24' of the cylinder 19 are provided with their respective connectors 25 are connected by hoses 27 to their corresponding openings 26 and 26' on the back surface of the vacuum back. The openings 24' and 26' connected with the groove 11 at the top of the vacuum contact surface 4 of the vacuum back 3 and the others connected with their respective grooves 12 of the corridors of the vacuum zones 13.

Within the cylinder 19 is a piston rod 30, the top end of which is provided with a piston head 31, the bottom end of which is joined to a projecting piece 28 at the lower bottom part of the rear case 1 by a pin-joint 29. When the vacuum back 3 moves up or down, the cylinder 19 being secured to it will move accordingly and as the piston rod 30 is secured to the rear case, the piston head 31 will be displaced within the cylinder 19. In the situation when centerline Y—Y of the maximum vacuum contact zone 13 of the vacuum contact surface 4 is centered with the optical axis, air will be aspirated through all the hoses 27 and openings 24 and passed out through the connector 23 of the cylinder 19.

A bulkhead 32 is provided within the top part of the cylinder 19 so as to separate the top opening 24' for suction from the main chamber of the cylinder 19 and a valve shaft 33 is provided which runs through the center of both the top end 19' of the cylinder 19 and the bulkhead 32. Between the upper surface of the bulkhead 32 and a flange 34 is a compression spring 35 by which a valve 36 at the lower end of the valve shaft 33 usually closes the opening 37 of the bulkhead 32.

The part 38 is a roller which travels along the vacuum contact surface 4 either up or down. Both ends of the said roller 38 are attached to their respective chains 40—40 between a pair of sprockets 39—39 provided above and below the sides of the surface of the vacuum back 3. The up/down travel of the roller 38 is controlled by the right or reverse turn of motors 40'—40' provided for moving the sprockets 39—39, the number of revolutions of the motors 40'—40' being regulated. The roller 38 is positioned slightly forward of the continuous surface of the vacuum contact surface 4 when it is brought to a stop at its position at the top surface.

The part 41 is a cutter for film which fits the groove 11 at the upper edge of the vacuum contact surface 4. The cutter 41 is attached to and suspended from a chain 43 between sprockets 42—42' provided on the upper sides of the vacuum back 3, the sprockets 42 being turned for a specific number in either the right or left direction by the rotation of a motor 44 provided so as to reciprocate the cutter 41 along the groove 11.

The part 45 is contact screens which are suspended from bars 47 of support frames 46—46' installed in the upper half section of the rear frame 1, one of said contact screens 45 being lowered in front of the vacuum contact surface 4 of the vacuum back 3 by a motor 52 provided and by right and left U-shaped supports 49—49 which hold the bars 47 and which are attached to their respective chains 51—51 spanning top and bottom sprockets 50—50' on both sides behind the frame 46—46', the sprockets 50—50' turning the chains 51—51 thereby lowering the U-shaped supports 49—49 and the contact screen 45 along their respective slots 48—48 between the fore and rear frames 46—46'.

The parts 53 are roll films installed in the upper part of the rear case 1, the respective roll films 53 being fed to the vacuum contact surface 4 by their respective roller units 54.

This invention incorporates the various parts as explained by which the film of the desired size is contacted against the surface 4 of the vacuum back 3 by selecting the adequate vacuum zone 13 of the said film and the contact screen 45 is lowered in front of the film to cover it and vacuum contacted over and against it by aspirating air from the groove 11 and the zone the size of which is one size larger than the size of the zone used for the film.

More specifically to expose the image on the film, start the motor 7 and move the vacuum back 3 so that the center of the zone 13, the size of which corresponds to that of the film and the optical axis of the image are aligned by moving the guide 9 by the screw 8 and the vacuum back 3 along the guide rails 2—2 on both sides of the rear case 1. By so doing, the cylinder 19 moves up and down together with the vertical movement of the vacuum back 3 will determine the zones 13 required for vacuum contacting the film to the surface 4 of the vacuum back 3 according to the size of the film. The piston 31 (which is stationary by being connected to the base of the rear case 1 by piston rod 30) is relatively displaced within the cylinder thereby allowing aspiration of the required zones 13 to take place and make the vacuum at the respective openings 26 of the corridors of zones 13, it will be recalled that zones 13 are connected with the connectors 25 of each opening 24 provided along the side of the cylinder 19 with hoses 27, thus, roll film 53 fed by the rollers 54—54 is vacuum contacted against the surface 4 of the vacuum back 3.

When the vacuum pump (not shown) is operated, the roll film 53 contacts the vacuum back 4 by the aspiration of air through the grooves 12 which form the respective zones 13.

The electric motors 40'—40' are then turned for a specific number in the right and the reverse directions and the sprockets 39—39 will turn the chains 40—40 connecting the two pairs of sprockets 39—39' down and up for a given distance. As the roller 38 is attached to the chains 40—40, this roller 38 will reciprocate over the surface of the film, the film itself being vacuum contacted against the surface of the vacuum back 3 and thereby squeezing out any air trapped between the film and the surface of the vacuum back 3 within the contact zone 13.

During this time, the motor 44 for the sprocket 42 is turned in the right and reverse directions in order to reciprocate the cutter 41 along the groove 11 by the chain 43 between the sprockets 42—42'. The cutter attached thereby cut the roll film 53 at the top of the contact zone 13.

After having finished this operation, the motor 53 for the sprockets 50—50 is turned to lower the contact screen 45 which is suspended from the bar 47, both ends of which are on the U-shaped supports 49—49 which are attached to the respective chains 51—51 spanning the two pairs of sprockets 50—50'. The contact screen 45 thereby is lowered in front of the film which is vacuum contacted by the contact zone 13 onto the surface of the vacuum back 3.

The vacuum contacting of the screen is accomplished by motor 15 being switched on and the screw 18 turning in the proper direction so that the guide piece 20 through which the screw 18 passes will move up thereby raising the cylinder 19. This displaces the cylinder with respect to the stationary piston head 31 so that the contact zone 13 is increased one size larger than those used for contacting the contact screen 45 against the vacuum back 3 over the surface of the film. It should be noted that regardless of the film size the vacuum for the screen contacting is only made one size larger. This is because bracket 14 is moved with the vacuum back and cylinder 19 and relative movement between bracket 14 and cylinder 19 is only accomplished by motor 15.

With the contact zone 13 thus made to function one size larger than those used for film contact, the contact screen 45' covering the entire surface of the film is vacuum contacted briefly, this is accomplished by the upward movement of the cylinder 19 by which the top protruding end of the valve shaft 33 hits the bottom surface of the projecting place 14. This causes valve shaft 33 which protrudes to be pushed in thereby opening the small holes 37 of bulkhead 32 and valve 36. The passage of air between the duct 24' and the interior of the cylinder 19 is permitted and vacuum suction of the groove 11 starts by the aspiration of air through the duct 24' and its hose 27 thereby forcing the contact screen 45' to contact firmly the surface of the film which is in contact against the corridors of the contact zone 13 by vacuum suction.

The roller 38 is again rolled down and up over the contact screen 45 for perfect contact and all preliminary procedures for film exposing are completed.

After exposure, switch off the vacuum pump to release the film and the contact screen from the vacuum back and the film will drop away. Switch on and turn the motors 52 and 15 in the reverse direction so as to move the contact screen 45 and the cylinder 19 back to their former positions. Thereafter, the operation is repeated for consecutive work.

By this invention, it is possible to vacuum contact the film of a desired size to the surface of the vacuum back by automatically selecting the vacuum zone corresponding to the size of the said film through the operation of centering the vacuum back accordingly and to vacuum contact the contact screen onto the vacuum back over the film by using the top edge groove and a vacuum zone one size over those used for the film.

This invention therefore permits perfect contact of the film and the contact screen on the surface of the vacuum back for exposing the image on the film, and automatic operation instead of manual operation is possible by providing suitable relay circuits, limit switches, etc., so that the relative sequences can be switched on to operate in turn.

Although in the explained embodiment of the invention, the groove 11 has dual purposes of film cutting and film suction, it may be limited only to the former purpose. In this case, a separate air passage for vacuum suction must be provided in parallel with and immediately below over a part of or the whole of the length of the groove 11.

The embodiment of this invention refers to a type of photomechanical camera, the exposure by which can be made on its vacuum back in its vertical position; however, it can also be embodied in a photomechanical camera, the vacuum back of which is of the horizOntal type with the same resulting efficiency.

I claim:

1. A device for controlling automatically the suction zones of vacuum back in a photomechanical camera, comprising:
    a vacuum film holder in the rear case of the camera;
    means for moving said vacuum film holder in said camera in a direction perpendicular to the optical axis of said camera;
    said vacuum film holder including an edge airpassage located along one end of said holder perpendicular to the direction of movement of said holder, and a plurality of substantially U-shaped airpassages on its front surface, thereby forming a plurality of rectangular vacuum contact zones,
    a cylinder communicating with a vacuum means, said cylinder having an opening at a first end thereof to receive a piston and having a plurality of openings along said cylinder, connecting said cylinder with various said airpassages, the number of said openings being equal to the number of said zones and the effective distance between the openings being related to the distances between zones;
    a piston inserted into said cylinder, the axis of said cylinder being in the same direction with that of the movement of the vacuum film holder, said cylinder mounted with respect to said piston to enable movement of said vacuum film holder to relatively move said cylinder and piston to change the number of said airpassages communicating with said vacuum means; and control means for changing the size of the actuated vacuum zones by one size by causing a fixed relative motion between said piston and said cylinder, and for simultaneously actuating air suction through said edge airpassage, thereby enabling a contact screen to be held over said film by a vacuum.

2. The structure of claim 1 wherein said control means includes a valve means coupling at least one opening in said cylinder to said vacuum film holder after the film has been contacted to said holder.

3. The structure of claim 1 wherein:
said cylinder has a valve means attached to at least one opening on the second end thereof and connected to said edge airpassage, and said control means is a means for moving said cylinder a fixed distance with respect to said piston so as to change the number of airpassages communicating with said vacuum means by one and simultaneously actuating said valve to place said edge airpassage in communication with said vacuum means.

4. The structure of claim 3 wherein:
said piston is connected to the frame of said camera;
said cylinder is connected to said vacuum film holder through a motor-lead screw means;
said valve means is a linearly actuated valve; and
said control means is comprised of said motor-lead screw means and a mechanical stop which actuates said valve means when said cylinder approaches one end of its travel relative to said vacuum film holder.

5. The structure of claim 4 wherein said means for moving said vacuum film holder is a second motor-lead screw means.